United States Patent [19]

Guillemin

[11] Patent Number: 4,947,735
[45] Date of Patent: Aug. 14, 1990

[54] DISTRIBUTION BOX FOR A HEATING AND/OR AIR CONDITIONING APPARATUS, ESPECIALLY FOR AN AUTOMOTIVE VEHICLE

[75] Inventor: Jean Guillemin, Elancourt, France
[73] Assignee: Valeo, Paris, France
[21] Appl. No.: 354,995
[22] Filed: May 22, 1989

[30] Foreign Application Priority Data

May 27, 1988 [FR] France .................. 88 07121

[51] Int. Cl.$^5$ ............................................ B60H 1/00
[52] U.S. Cl. ..................................... 98/2.06; 98/2.08
[58] Field of Search ................. 98/2, 2.05, 2.06, 2.08, 98/2.11

[56] References Cited

U.S. PATENT DOCUMENTS

| 2,532,882 | 12/1950 | Beatty, Jr. | 98/2.06 |
| 4,406,214 | 9/1983 | Sakurai | 98/2.08 |
| 4,712,611 | 12/1987 | Witzel | 165/122 |

FOREIGN PATENT DOCUMENTS

| 2500380 | 8/1982 | France . | |
| 2547543 | 12/1984 | France . | |
| 2601301 | 1/1988 | France . | |
| 133912 | 8/1985 | Japan | 98/2.11 |

Primary Examiner—Harold Joyce
Attorney, Agent, or Firm—Dennison, Meserole, Pollack & Scheiner

[57] ABSTRACT

A distribution box for a heating and/or air conditioning apparatus, particularly for an automotive vehicle, includes at least one fresh air inlet duct, air outlet ducts, regulating means for regulating the distribution and the temperature of the air leaving via the outlet ducts, the inlet duct (or each inlet duct) including an entry section connectable to the outlet section of a feed duct for supplying fresh air in a flow direction substantially tangential to the direction of flow of the air in the inlet duct. The distribution box further includes a distribution grid extending across the inlet section of the or each air inlet duct, the distribution grid comprising a multiplicity of vanes placed in a configuration such as to set up air flows which are differentiated from each other in a controlled manner.

10 Claims, 3 Drawing Sheets

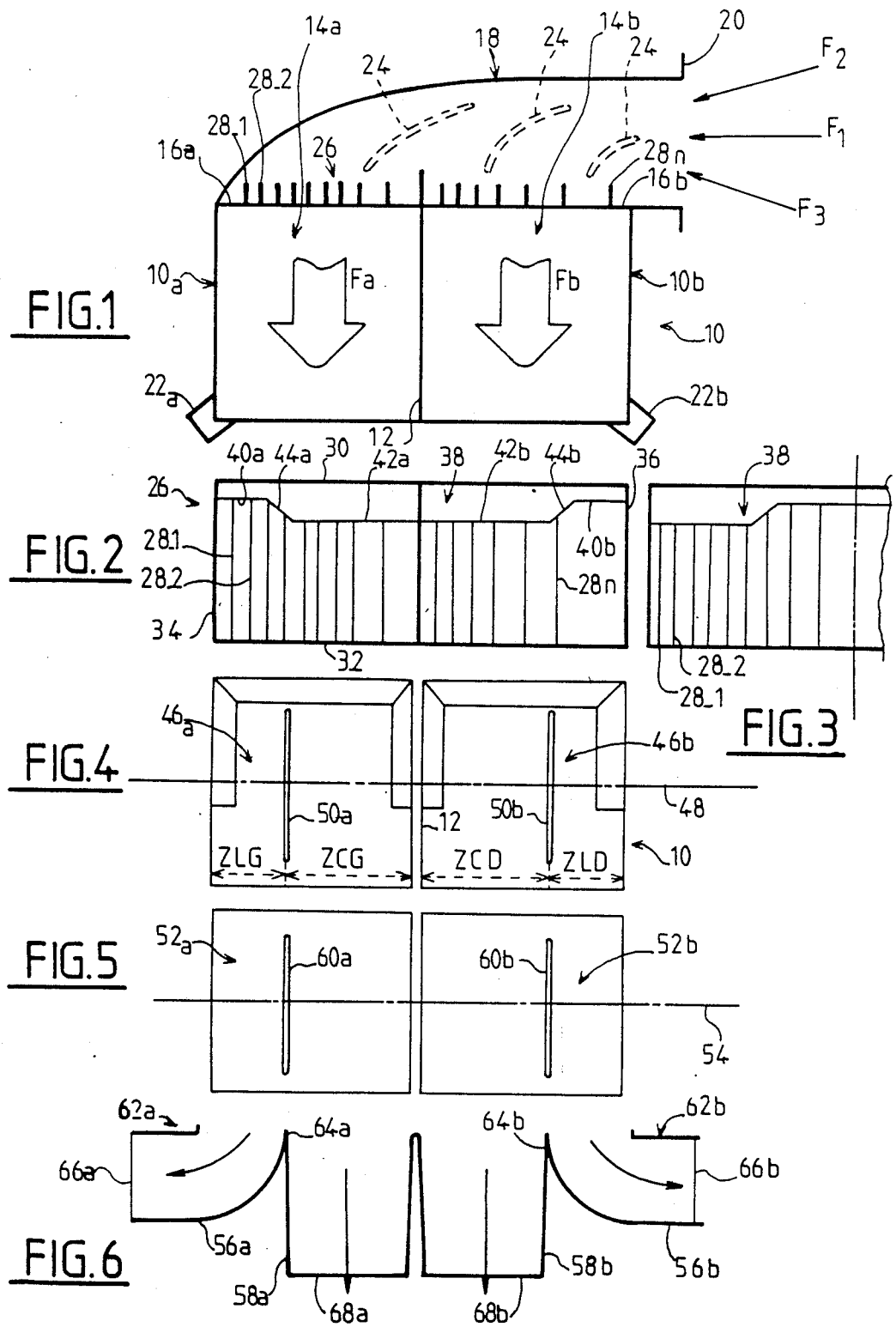

DISTRIBUTION BOX FOR A HEATING AND/OR AIR CONDITIONING APPARATUS, ESPECIALLY FOR AN AUTOMOTIVE VEHICLE

FIELD OF THE INVENTION

This invention relates to a distribution box for a heating and/or air condititoning apparatus, particularly for automotive vehicles.

More particylarly, it is concerned with a distribution box of the kind comprising at least one inlet duct for fresh air, with air outlet ducts and regulating means for regulating both the distribution and the temperature of the air leaving through the outlet ducts, with the inlet duct (or each inlet duct) having an inlet section which is adapted to be connected to the outlet section of a feed duct, of bent form, for supplying fresh air in a direction of flow substantially tangential with respect to the direction of flow of the air within the inlet duct or ducts.

BACKGROUND OF THE INVENTION

In a distribution box of the above type, the bent feed duct is arranged for connection to the outlet of a motorised fan or blower unit, for example comprising a turbine or a blower for forcing fresh air from outside the passenger compartment of the vehicle into the distribution box; alternatively this air may be drawn from an air conditioning unit. The fresh air propelled by the motorised unit first flows into the feed duct and then into the air inlet duct or ducts, after which it passes through the distribution box in which it may, if required, be heated by means of a heat exchanger. Finally the air is blown into the passenger compartment through the outlet ducts.

In arrangements of this type, the distribution of flow velocities and mass flows of the air is not homogeneous at the outlet of the turbine or blower of the motorised unit, and this is therefore also true at the inlet section of the air inlet duct or ducts. It follows that it remains non-homogeneous downstream of the latter, in the heating and/or air conditioning means itself. In order to overcome this disadvantage it has previously been proposed to provide deflector vanes mounted in the bent feed duct and alinged towards the input section of the input duct or ducts through which air flows into the distribution box, in such a way as to try and obtain as homogeneous a distribution as poossible for the flow velocities and mass flows of the air passing into the inlet duct.

This known solution does however also have certain disadvantages. First of all this homogeneous distribution has proved difficult to achieve in practice, and calls for each feed duct to be manufactrued in a particular special way. Also, this result can in any case only be obtained over a rather limited range of operating speeds of the turbine or blower. If these speeds are increased above this range, the air streams become detached from the deflector vanes, so that certain zones of the inlet duct or ducts then cease to receive any air.

In addition it is known from the French Patent Application No. 86 08115, publication No. 2 583 000 (U.S. Pat. No. 4,712,611), to provide a baffle which is of generally grid-like form to impart some homogeneity to the air stream passing through the heat exchanger of a heating or ventilating apparatus. However, this calls for an apparatus of different construction, since the feed duct which supplies fresh air to the input ducts is not bent. In addition, this known solution has the major disadvantage of achieving a homogeneous distribution only at the cost of a substantial loss of pressure due to the presence of the baffle.

SUMMARY OF THE INVENTION

Accordingly, an object of the invention is to provide a distribution box of the kind defined above, which does not have the disadvantages of distribution boxes of the prior art. While, up to the present time, attempts have been made to achieve homogenous distribution of the flow velocities and mass flows of the air passing into the distribution box, the present invention, by contrast, controls this loss of homogeneity in such a way as to obtain differentiated air streams into the distribution box and from it into the passenger compartment of the vehicle.

To this end, the distribution box according to the invention includes a distribution grid which extends across the inlet section of the air inlet duct or ducts. The grid has a multiplicity of vanes which are arranged in a configuration such as to set up controlled, differentiated air streams. The air streams can then be differentiated from each other as required, and not in an uncontrolled manner by the turbine or blower of the motorised blower unit. The invention not only makes it possible in this way to obtain, on demand, air streams at the entrance of the distribution box which are differentiated in a predetermined manner, but also enables them to be guided within the distribution box and passed into the passenger compartment through outlet ducts, all in a perfectly controlled manner with the initial differentiation preserved throughout.

In addition, the air flow distribution obtained using the distribution grid of the invention is independent of the operating speed of the turbine or blower.

In preferred embodiment of the invention, the vanes of the distribution grid extend in planes which are generally parallel to each other, and which extend perpendicular to the direction of flow within the feed duct and parallel to the direction of flow in the inlet duct or ducts. These vanes are preferably made to be thin so as to reduce pressure losses.

Air flow distribution can be adjustable on demand, using an appropriate configuration of the distribution grid vanes. This distribution may be chosen as a function of the number of these vanes and their relative disposition, with the spacing between any two consecutive vanes not being constant over the whole length of the grid.

According to another feature of the inventionn, the grid is removable, which allows a grid of one given configuration to be replaced by one having another configuration, if required, so as to adapt the system for any particular requirements.

According to a further feature of the invention, the grid includes a mask which covers part of its cross section in such a way as to modify the distribution of the differentiated flows.

The invention is especially aopplicable to a distribution box of the kind which, in a known manner, further includes a fresh air transmission branch interposed between the inlet duct or ducts and the outlet ducts, an air heating branch interposed between the inlet duct or ducts and the outlet ducts and containin a heat exchanger, and at least one mixing valve having a valve member which is mounted for rotation about an axis and disposed at the junction of the inlet duct or ducts and the fresh air transmission and air heating branches, in order to vary the distribution, between the two last mentioned-branches, of the mass of air arriving through the inlet duct or ducts; and to vary, in consequence, the temperature of the air leaving via the outlet ducts.

According to a further feature of the invention, in a distribution box of this said type, the vanes of the distribution grid extend orthogonally with respect to the mixing valve axis.

According to yet another feature of the invention, the above mentioned mask has, in this particular case, an oblong shape and extends lengthwise in a general direction which is parallel to the axis of the mixing valve, the width of the mask varying along its length. In this way, it is possible to obtain different distributions of the air streams as a function of the position of the mixing valve.

According to a further feature of the invention, the mixing valve includes at least one guide vane which projects from its valve member in a plane which is perpendicular to the axis of rotation of the valve, in such a way as to guide the air streams previously differentiated by the distribution grid. In a modification, this valve may itself include a mask which extends from the moveable valve member in a general direction which is parallel to the axis of rotaiton of the latter.

A distribution box of the type defined above includes in known manner at least one distribution valve mounted for rotation about an axis and adapted to modify the distribution of the air exiting via the outlet ducts. The invention preferably provides that at least one of these distribution valves includes at least one guide vane which projects from the moveable member of the valve in a plane perpendicular to its axis of rotation, in order to guide the air streams previously differentiated by the distribution grid and guided, maintaining this differentiation, to the distribution valves through the mixing valve.

Preferably, an internal guide vane is provided in at least one of the outlet ducts, with this guide vane extending in a plane parallel to the direction of air flow in the duct and arranged to further channel the differentiated air flows. In this way, the air streams differentiated by the distribution grid, are successively guided through the mixing valve, the distribution valve or valves, and the guide vanes in the outlet ducts, the initial distribution being preserved throughout in respect of air flow velocity and mass flow.

In the description which follows, which is given solely by way of example, reference will be made to the accompanying drawings, listed below.

BRIEF DERIOPTION OF THE DRAWINGS

FIG. 1 is a view in cross section, showing diagrammatically the principle of a distribution box, together with the feed duct associated with it.

FIG. 2 is a plan view of the grid of the distribution box in a first embodiment.

FIG. 3 is a partial plan view of the grid in a second embodiment.

FIG. 4 is a cross section of the distribution box, seen through the mixing valve.

FIG. 5 is a cross section of the distribution box, seen through a distribution valve.

FIG. 6 is a cross section of the distribution box at the level of the delivery or outlet ducts which exhaust to a set of air outlet vents on the fascia panel.

DESCRIPTION OF PREFFERRED EMBODIMENTS OF THE INVENTION

Figure 7:
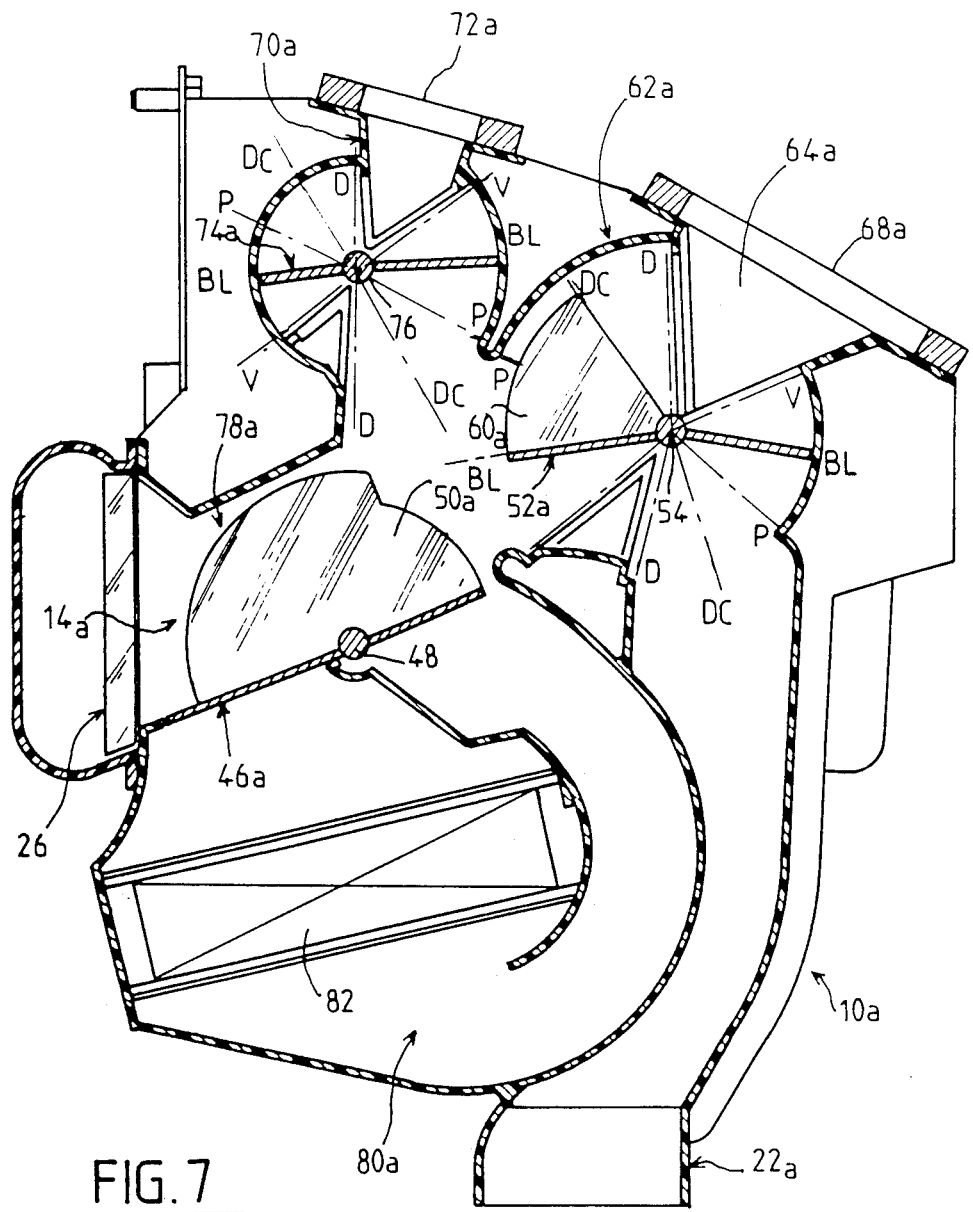
FIG. 7 is a view in cross section of a distribution box, taken on a plane which is perpendicular to the respective axes of the mixing valve and the distribution valve.

Reference will first of all be made to FIG. 1, which shows a distribution box 10 which forms part of a heating and ventilating apparatus, and/or an air conditioning apparatus, of an automotive vehicle. The box 10 has two parts, namely a left hand part 10a and a right hand part 10b, which are generally symmetrical with respect to a central separation plane in which lies a bulkhead 12 which extends pependicularly to the plane of the drawing. The two parts 10a and 10b are arranged to supply heating and ventilation, and/or air conditioning, to the left hand side and the right hand side, respectively, of the passenger compartment of the vehicle. The box 10 has two air inlet ducts 14a and 14b, having respective inlet sections 16a and 16b which are generally rectangular. The inlet ducts 14a and 14b are connected to the outlet section of a feed duct 18, which is of a bent shape and which is so arranged as to provide fresh air in a direction of flow F1, substntially tangential with respect to the direction of flow of the air into the inlet sections 16a and 16b (as indicated by the arrows Fa and Fb).

The feed duct 18 has an inlet end 20 which is adapted to be connected to the outlet of the casing of a motorised blower unit (not shown) which includes a turbine or blower for blowing fresh air originating from outside the passenger compartment. The input end 20 may, however, equally well be connected to an air conditioning unit.

Fresh air introduced into the two parts of the distribution box 10 is heated if required, and is then passed into outlet ducts which exhaust into the passenger compartment itself. FIG. 1 shows two such outlet ducts 22a and 22b, which exhaust respectively into the vicinity of the driver's feet and into that of the passenger's feet, in the front part of the passenger compartment. As indicated in the introduction to this spoecification, the distribution of the velocities and mass flow rates of air at the outlet of the blower unit (as indicated by the arrows F1, F2 and F3) is not homogeneous, and this distribution is furthermore not controlled. In order to overcome this disadvantage, prior art arrangements have employed deflector vanes 24 as indicated in broken lines in FIG. 1. In accordance with the present invention, the feed duct 18 does not need to have any internal deflector vanes. The feed duct leads directly into the inlet sections 16a and 16b of the box 10.

A distribution grid 26 extends across the inlet sections 16a and 16b of the inlet ducts 14a and 14b, and comprises a multiplicity of vanes 28-1, 28-2 . . . 28-n. These vanes (collectively referred to from now on as the vanes 28) are arranged according to a configuration which is such as to set up differential air flows which are controllable. In the present example, the vanes 28 extend in planes which are generally parallel to each other, and which are perpendicular to the flow direction F1 in the feed duct 18, being parallel to the flow direction Fa, Fb in the air inlet ducts 14a and 14b. The vanes 28 are made thin, in order to reduce flow losses; they are disposed at spacings which vary as indicated in FIGS. 1 and 2.

The grid 26 is stationary and is formed as a single member, although it could just as well be formed in two parts such as to be adaptable respectively to the inlet sections 16a and 16b. In this example however, the distribution grid, which is preferably made of injection moulded plastics material, comprises a rectangular frame having two long sides 30 and 32 and two short sides 34 and 36 (FIG. 2). The vanes 28 extend parallel to the short sides 34 and 36, with each vane attached at both ends to the two long sides 30 and 32 of the grid 26. The vanes 28 have an upstream edge which projects into the feed duct 18. As is shown in FIG. 2, the spacing between the vanes 28 is not constant, and this allows the streams of fresh air introduced into the interior of the inlet ducts 14a and 14b to be differentiated from each other and appropriately channeled.

The grid 26 also includes a mask 38, which in this example is generally oblong in shape and which extends inwardly form the side 30 over the whole length of the grid between the short sides 34 and 36. The mask 38 is of varying width, having two opposed end portions with edges 40a and 40b, parallel to the side 30 and quite close to the latter; while it also has two central edges 42a and 42b which are again parallel to the edge 30 but which are spaced further away from it. The edges 40a and 42a are connected to each other through an inclined edge portion 44a, while the edge portions 40b and 42b are connected to each other through another inclined edge portion 44b. Thus, the width of the mask 38 is larger in its central portion than in its end or marginal poritons.

In the modified embodiment shown in FIG. 3, the distribution of the various vanes 28 is different from that of the vanes in the grid shown in FIG. 2. The shape of the mask is also different, in that it is wider at the ends than in the middle. As shown in FIG. 4, the box 10 is provided internally with a mixing valve having two valve members 46a and 46b which are symmetrical with respect to the bulkhead 12 and which are mounted for rotation about a common axis 48. The function of the mixing valve is to regulate the temperature of the air leaving through the respective outlet ducts of the left hand and right hand portions 10a, 10b of the distribution box. The two valve members of the mixing valve may be synchronised, in which case regulation of the temperature is the same for both the driver and the passenger. Alternatively the two valve members of the mixing valve may be controllable independently of each other, so as to regulate the air temperature on the driver's side differently from that on the passenger's side. In a modification, the members 46a and 46b may be combined in a single member.

The relative position of the grid 26 and the mixing valve is such that the vanes 28 of the grid extend orthogonally to the axis 48 of the valve. In addition, the mask 38 extends lengthwise in a general direction which is parallel to the axis 48.

The mixing valve has two guide vanes 50a and 50b, projecting from the mixing valve members 46a and 46b. The guide vanes 50a and 50b lie in a plane which is perpendicular to the axis of rotation 48. The function of the guide vanes 50a and 50b is to channel the air streams previously differentiated by the distribution grid 26. These air streams are then directed towards two distribution valves.

One of the said distribution valves (not shown in FIGS. 1-6, but seen in FIG. 7) ensures that air is directed towards outlet ducts which supply demisting and deicing vents at the level of the fascia.

The other, or main, distribution valve is shown in FIG. 5. It consists of two valve members 52a and 52b, mounted on an axis of rotation 54 which is parallel to the axis of rotation 48 (FIG. 4). The function of this distribution valve is to ensure proper distribution of the air between the outlet ducts 22a and 22b which exhaust into the lower part of the passenger compartment, and outlet ducts 56a, 56b, 58a and 58b which exhaust through vents at the level of the fascia panel of the vehicle (FIG. 6).

The valve members 52a and 52b of the main distribution valve may be controlled in synchronism with each other, or independently as for the mixing valve described above. The valve members 52a and 52b respectively include two guide vanes 60a and 60b which project in planes perpendicular to the axis of rotation 54. The distance between the guide vanes 60a and 60b corresponds to that between the guide vanes 50a and 50b. Thus the air directed and guided by the vanes 50a and 50b is subsequently also directed and guided by the vanes 60a and 60b of the main distribution valve. As is shown in FIG. 4, the guide vanes 50a and 50b define four zones ZLG, ZCG, ZCD and ZLD. These may be referred to, respectively, as a left hand lateral zone, a central left hand zone, a central right hand zone and a right hand lateral zone.

As can be seen from FIG. 6, the outlet ducts 56a and 58a form the two branches of a common conduit 62a which includes an internal baffle 64a disposed in line with the guide vanes 50a and 60a. This conduit 62a is thus divided in order to form the outlet ducts 56a and 58a, which teminate respectively in a left hand lateral vent 66a and a central left hand vent 68a. In the same way, the outlet ducts 56b and 58b extend from a common duct 62b, which has a baffle 64b mounted in line with the guide vanes 50b and 60b. The outlet ducts 56b and exhaust respectively through a right hand lateral vent 66b and a central right hand vent 68b. Differentiated air streams are thus obtained, and these can be set as required, according to the above mentioned configuration of the grid 26 and that of the guide vanes carried by the mixing valve, the guide vanes carried by at least one of the distribution valves, and guide vanes which may also be arranged in certain of the outlet ducts.

In view of the presence of the mask 38 (FIG. 2), it is possible to obtain, by opening or closing the mixing valve, flow rates which are different as between the lateral and central zones. Where the mask is as shown in FIG. 2, when the mixing valve is only slightly open, there tends to be a flow of air only towards the lateral zones, without an air flow toward the central zones being set up. The opposite applies when the mask is as shown in FIG. 3. In this way, the distribution grid allows the air flow to be controlled in such a way that it is divided into streams which are different from each other, and which in consequence influence the temperature of the air which is guided by the guide vanes and directed towards the outlet ducts. Reference is now made to FIG. 7, which shows in cross section the left hand half 10a of the distribution box. The casing of the distribution box is defined by walls with parallel generatrices. The general configuration of the casing is one that is known per se. The right hand half 10a defines, besides the inlet duct 14a described above, an air outlet duct 70a which terminates in a demisting and deicing vent 72a in the fascia panel. The air distribution through this outlet duct is controlled by an auxiliary distribution valve having a valve member 74a which is rotatably mounted on an axis 76.

The other half of the distribution box is not shown because it is similar to that shown in FIG. 7, but for convenience it may be described as having an outlet duct 70b terminating in a vent 72b controlled by another valve member 74b of the distribution valve, the valve member 74b being mounted in common with the member 74a on the axis 76. The valve members 74a and 74b of the auxiliary distribution valve do not include guide vanes or internal baffle, though these may be provided if desired.

FIG. 7 shows the outlet duct 62a and its internal baffle 64a, which take the form of a generally triangular plate member extending from the vent 68a inwardly towards the axis of rotation 54 of the main distribution valve member 52a. In the form shown in FIG. 7, the guide vane 60a takes the form of a circular sector extending over an angle smaller than 90°. The function of the valve member 52a is to regulate distribution, as between the outlet ducts 58a and 56a in the region of the vents and the outlet duct 22a, of air passed into the lower part of the passenger compartment.

The left hand half 10a of the distribution box further includes a fresh air transmission branch 78a which is interposed between the inlet duct 14a and the outlet ducts, together with a warm air branch 80a, which is also interposed between the inlet duct and the outlet ducts and which contains a heat exchanger 82. In the same way the right hand half 10b of the distribution box has two branches, symmetrical with the branches 78a and 80a. These two branches of the right hand half, though not shown, may be referred to for convenience by the numerals 78b and 80b. The heat exchanger 82 is arranged to be supplied with hot fluid, for example the engine coolant fluid of the vehicle. The heat exchanger extends over the whole width of the distribution box in such a way as to allow air to be heated in the branches 80a and 80b. The mixing valve 46a, 46b, disposed at the junction of the inlet duct 14a, 14b with the branches 78a, 78b and the branches 80a, 80b, permits variation in known manner of the distribution between these two branches of the mass flow of air arriving through the inlet duct, and therefore also of the temperature of the air leaving through theoutlet ducts. The distribution valves 52a and 52b and the distribution valves 74a and 74b can be set to five different positions, designated respectively by the symbols V (ventilation), BL (bilevel), P (feet), DC (deicing and heating) and D (deicing).

In the position V, the air cannnot be distributed except through the outlet duct 62a which terminates in the vents on the fascia panel. In the position BL, in which the valve is shown in FIG. 7, the air is distributed simultaneously towards the outlet duct 62a terminating at the vents on the fascia panel, and into the outlet duct 22a. In the position P, the air is directed solely towards the outlet duct 22a. In the position DC, it is directed simultaneously towards the outlet duct 70a and the outlet duct 22a. Finally in the position D, only the duct 70a is supplied. Similar positions may of course be provided for the distribution valves of the other half 10b of the distribution box.

Figure 8:
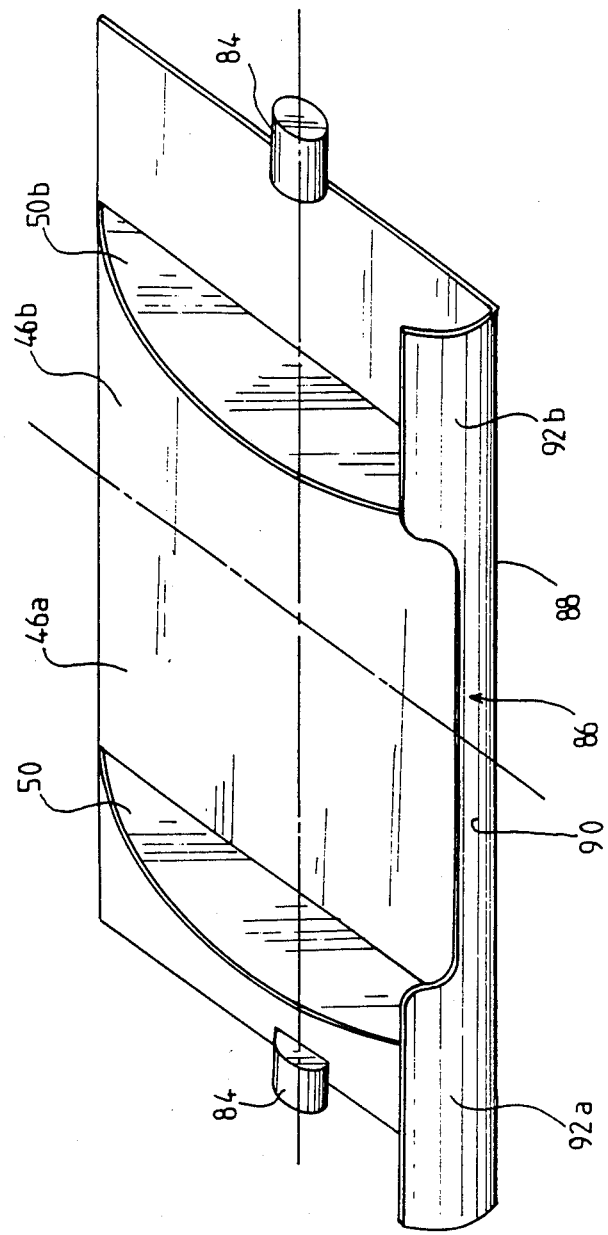
FIG. 8 is a perspective view of the mixing valve member.

Reference is now made to FIG. 8, which shows the mixing valve member 46a, 46b in monobloc or unitary form. It comprises two trunnions 84 by which it is mounted for rotation inside the distribution box. Besides the guide vanes 50a and 50b, the valve member includes a mask 86 which extends from a longitudinal edge 88 of the valve member and over the whole length of the latter. The mask 86 has a central portion 90 which is narrower than its outer or end portions 92a and 92b. In a case such as this it is unnecessary normally to provide a mask on the distribution grid 26, since the mask 86 of the mixing valve lies facing the input opening for fresh air.

The distribution box according to the invention thus allows air flows to be controlled, in respect of both mass flow and temperature, at the level of the air inlet duct and right up to the outlet ducts. The invention is thus easier to put into practice than in the case where, as in the prior art, deflector vanes are provided, since it is enough to provide an appropriate grid which may if necessary be replaced by an alternative grid according to requirements.

What is claimed is:

1. A distribution box for a heating and/or air conditioning apparatus, particularly for an automotive vehicle, wherein the distribution box comprises at least one fresh air inlet duct defining an inlet section, a plurality of air outlet ducts, means associated with said inlet and outlet ducts for regulating the distribution and temperature of air delivered through the outlet ducts, a feed duct of bent configuration for supplying fresh air, said feed duct defining an outlet section and further defining a direction of flow for said fresh air that is substantially tangential with respect to a direction of flow of the air in the said at least one inlet duct, the inlet section of the or each inlet duct being connected with the outlet section of the feed duct, the distribution box further comprising a distribution grid extending across said inlet section of the said inlet duct or ducts, the distribution grid comprising a plurality of spaced vanes positioned in said grid with respect to each other to divide the air flowing therethrough into a plurality of air streams that are controllably different from each other.

2. A distribution box according to claim 1, wherein the vanes of the distribution grid extend in planes generally parallel to each other, with these planes extending perpendicular to the direction of flow in the feed duct and parallel to the direction of flow in the air inlet duct or ducts.

3. A distribution box according to claim 1, wherein the distribution grid includes a mask which obturates a portion of the cross section of the grid.

4. A distribution box according to claim 1, wherein the distribution grid is removable.

5. A distribution box according to claim 1, further comprising a fresh air transmission branch interposed between said at least one inlet duct and the said outlet ducts, a heat exchanger mounted in the fresh air transmission branch, at least one mixing valve having a valve member and defining an axis of rotation thereof, a fresh air transmission branch and an air heating branch, defining a junction with said at least one inlet duct, means mounting said mixing valve member or members rotatably about the said axis of rotation at the said junction whereby to vary the distribution as between the fresh air transmission branch and the air heating branch, of the mass of air arriving through th inlet duct or ducts, and whereby also to vary the temperature of the air leaving through the outlet ducts, the vanes of the distribution grid extending orthogonally with respect to the said axis of rotation of the mixing valve.

6. A distribution box according to claim 3, wherein the mask of the distribution grid is oblong in shape, and extends lengthwise in a direction generally parallel to the axis of rotation of the mixing valve, the mask further defining a variable width.

7. A distribution box according to claim 5, wherein the mixing valve comprises at least one guide vane which projects from the said valve member thereof in a plane perpendicular to its axis of rotation whereby to guide the air streams differentiated by the distribution grid.

8. A distribution box according to claim 5, wherein the mixing valve comprises a mask which projects from its valve member in a direction generally parallel to the axis of rotation of the valve.

9. A distribution box according to claim 7, including at least one distribution valve having a valve member and defining an axis of rotation thereof, with means mounting the or each distribution valve member for rotation about said axis, whereby to modify the distribution of the air leaving through the outlet ducts, the distribution valve or valves further comprising at least one guide vane which projects from the valve member in a plane perpendicular to its axis of rotation, so as to guide the air streams differentiated by the distribution grid.

10. A distribution box according to claim 1, wherein at least one of the outlet ducts includes an internal baffle or guide vane extending in a plane parallel to the direction of the air in the outlet duct and such as to guide the said air streams.

* * * * *